United States Patent [19]

McConnell

[11] Patent Number: 4,842,126
[45] Date of Patent: Jun. 27, 1989

[54] AUGER FLIGHT SECTION

[76] Inventor: Allan R. McConnell, 255 Whiteswan Dr., Saskatoon, Saskatchewan, Canada, S7K 4M6

[21] Appl. No.: 298,292

[22] Filed: Jan. 17, 1989

Related U.S. Application Data

[63] Continuation of Ser. No. 62,698, Jun. 16, 1987, abandoned.

[51] Int. Cl.⁴ ............................................. B65G 33/32
[52] U.S. Cl. ................................... 198/666; 198/676; 198/677; 403/383; 464/37
[58] Field of Search ............... 198/666, 676, 677, 662, 198/664, 671, 559; 403/383, 356, 2, DIG. 3; 464/30, 37

[56] References Cited

U.S. PATENT DOCUMENTS

| | | | |
|---|---|---|---|
| 1,113,688 | 10/1914 | Porter | 198/676 |
| 1,684,254 | 9/1928 | Bailey | |
| 2,279,640 | 5/1942 | Ringmarck | |
| 2,397,420 | 3/1946 | Jorgensen | |
| 2,539,630 | 1/1951 | Krueger et al. | 464/30 X |
| 2,606,643 | 8/1952 | Tidwell | |
| 2,609,115 | 9/1952 | Oklejas | |
| 2,704,161 | 3/1955 | Ogden | 198/664 X |
| 2,888,128 | 5/1959 | Allen | |
| 3,178,210 | 4/1965 | Dickinson | 198/666 X |
| 3,360,108 | 12/1967 | Voss | |
| 3,605,995 | 9/1971 | Maack | 198/676 X |
| 3,705,644 | 12/1972 | Kawchitch | 198/664 |
| 4,575,277 | 3/1986 | Dickey et al. | 403/383 X |
| 4,699,226 | 10/1987 | Müller et al. | 198/676 X |

FOREIGN PATENT DOCUMENTS

| | | | |
|---|---|---|---|
| 979919 | 9/1975 | Canada | 198/667 |
| 1206115 | 6/1986 | Canada | 198/677 |
| 347519 | 1/1922 | Fed. Rep. of Germany | 198/677 |
| 597608 | 3/1978 | U.S.S.R. | 196/676 |

*Primary Examiner*—Frank E. Werner
*Assistant Examiner*—Cheryl L. Gastineau
*Attorney, Agent, or Firm*—Adrian D. Battison; Stanley G. Ade

[57] ABSTRACT

A flight section for mounting at the feed end of an auger comprises an intergral moulding from a resilient elastomeric material such as natural rubber which includes a central sleeve portion and an outer flight. The sleeve has an inner surface for engaging around a shaft with the surface defining a part cylindrical portion and a flat portion by which torque is communicate from the shaft to the sleeve portion while allowing slippage to occur by distortion of the resilient sleeve portion when the torque exceeds a predetermined maximum. The flight extends over 360° and is shaped so that it increases in transverse width or thickness as it approaches the outer edge thereof thus defining a flat band around the outer edge. This acts to define a curved surface facing the material to be fed which cups the material and reduces slippage.

5 Claims, 2 Drawing Sheets

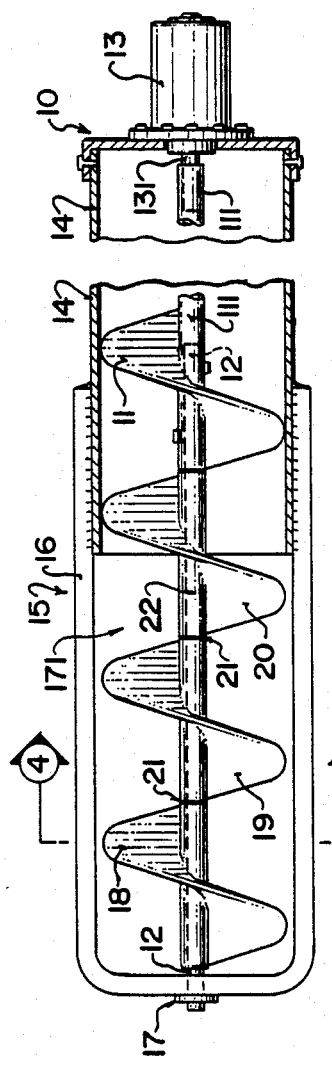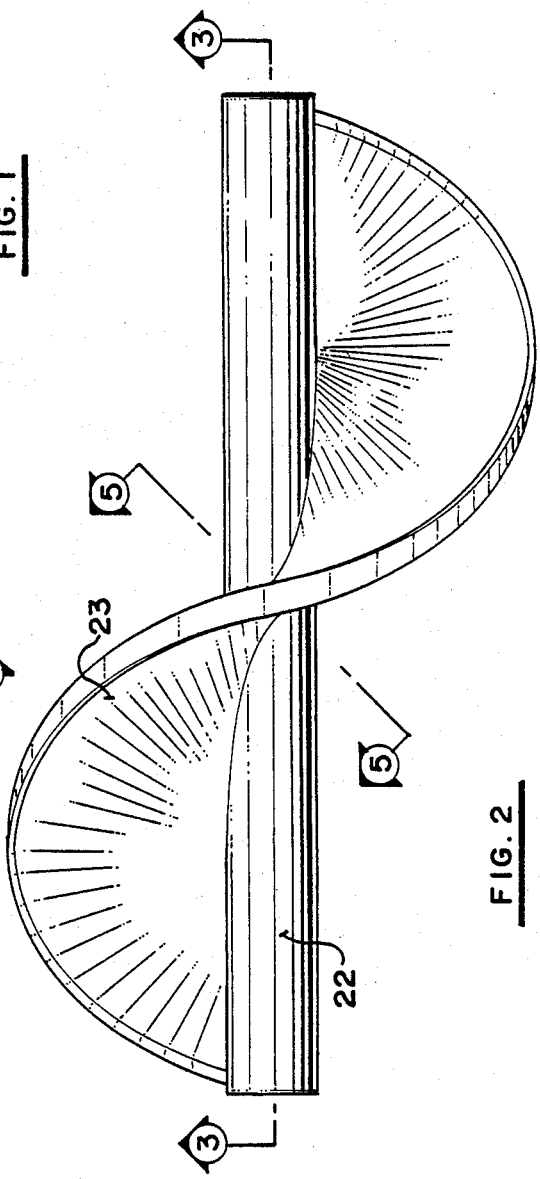
FIG. 1
FIG. 2

AUGER FLIGHT SECTION

This application is a continuation of application Ser. No. 062,698, filed June 16, 1987, now abandoned.

BACKGROUND OF THE INVENTION

This invention relates to an auger flight section for use in an auger of the type comprising an auger shaft which is drivingly rotatable about a longitudinal axis thereof and an auger tube surrounding the shaft.

Generally, augers of this type include a metal flight which extends from a feed end of the auger in which the flight and shaft are exposed from at least a part of the tube to a discharge end of the auger. The metal flight is helical in nature and forms a strip running along the shaft and extending from the shaft to the tube so that the shaft is centered in the tube. Such devices have been used and manufactured for many years and satisfactorily feed grain and other particulate materials at relatively high rates and with low power usage.

One problem which arises with augers of this type is that the flight at the feed end of the auger must be exposed in order that it can receive the material to be fed into the auger. In many cases a hopper device surrounds the auger flight at the feed end so that the grain or other particulate material from a truck or discharge system can be deposited into the hopper and fed through the auger. The flight when it is exposed is highly dangerous object in that it is rotating relatively rapidly and with enough force to transmit the material along the full length of the auger. Any object or limb of a person placed into the flight can therefore be seriously damaged. Attempts have been made to overcome this problem by providing a feed portion of the flight which is separated from the remainder of the flight and which is provided with a slip clutch arrangement so that when engaged with an object, the flight portion can slip relative to the shaft as soon as the torque exceeds a predetermined torque. One example of a device of this type is shown in my previous patent which is Canadian Pat. No. 1,206,115 issued June 17, 1986. This device is however disadvantageous in that it involves a number of separate pieces and in that the amount of torque communicated from the shaft to the flight section is determined by the adjustment of a number hose clamps which must be set by the person installing the device and which are subject to variation and corrosion.

SUMMARY OF THE INVENTION

It is one object of the present invention, therefore, to provide an improved device of this general type which enables the manufacture of the flight section in one piece and reduces the risk of serious injury or damage by engagement of a person or object with the exposed portion of auger flight.

According to the invention, therefore, there is provided a flight section for an auger of the type comprising a shaft rotatable about a longitudinal axis thereof and a tube surrounding the shaft, the flight section comprising a sleeve portion having a generally cylindrical outer surface and an inner surface for directly surrounding and contacting the shaft, a helical flight mounted on said outer surface for rotation therewith about said longitudinal axis, said sleeve portion and said flight being integrally moulded from a resilient elastomeric material, and said inner surface having a non-circular cross section arranged such that when engaging a corresponding shaped shaft it can receive torque therefrom up to a predetermined maximum and above said maximum allows slippage to occur between said shaft and said sleeve.

The use of this flight portion of elastomeric material enables the flight to flex when engaging a rigid object such as a part of the person so that it tends to throw out the part rather than draw it in as is the tendency with the conventional rigid flight. While this can cause a painful blow causing the person to jump back, it avoids serious injury.

Preferably the shaft is cylindrical with a flat portion on one side and the inner surface of the sleeve portion is correspondingly shaped with the flat thereon cooperating with a flat on the shaft to provide the communication of torque.

Preferably the sleeve portion includes an inwardly facing rib at each end thereof of reduced diameter relative to the inner surface so as to act as a seal on the shaft to prevent the entry of contamination.

Preferably the flight increases in transverse width as the diameter thereof increases culminating in an edge which forms a band lying in a cylindrical surface surrounding the shaft with the width of the edge being greater than the width of the flight adjacent the sleeve portion. With this increase in width being smoothly curved, a side surface of the flight provides a cup shaped portion which assists in grasping and forwardly feeding the material to be fed and avoids the development of a space between the outer edge of the flight and the inner surface of the tube as the flight tends to bend in an axial direction under the force applied by the material being fed.

The cup shaped portion is formed on both sides of the flight and hence the unit can be removed and reversed when the upstream feed side has worn to a degree sufficient to reduce feed efficiency.

According to the second aspect of the invention there is provided an auger comprising a shaft rotatable about a longitudinal axis thereof, a tube surrounding the shaft, a main flight section carried as the shaft for rotation therewith to forward material along the tube and an inlet flight section separate from the main flight section, the inlet flight section comprising a sleeve portion having a generally cylindrical outer surface and an inner surface for directly surrounding and contacting the shaft, a helical flight mounted on said outer surface for rotation therewith about said longitudinal axis, said sleeve portion and said flight being integrally moulded from a resilient elastomeric material, and said inner surface having a non-circular cross section arranged such that when engaging a corresponding cross section on said shaft it can receive torque therefrom up to a predetermined maximum and above said maximum allows slippage to occur between said shaft and said sleeve.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a schematic view partly in cross section of an auger incorporating the features of the present invention.

FIG. 2 is a side elevational view of an auger flight section of the auger of FIG. 1.

In the drawings like characters of reference indicate corresponding parts in the different figures.

DETAILED DESCRIPTION

Figure 3:
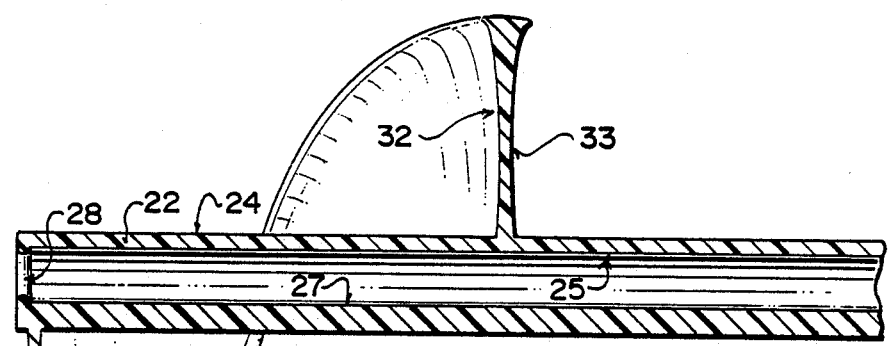
FIG. 3 is a longitudinal cross sectional view of the sleeve portion of the flight section of FIG. 2.

The auger shown in FIG. 1 comprises a main auger section 10 with a main auger helical flight 11 carried on a tube 111 screwed to a shaft 12 for corotation with the shaft which is driven by the drive shaft 131 of a motor schematically indicated at 13. The helical screw 11 is of conventional construction and hence no details will be given here, and is received within a tube or cylinder 14 through which the material is conveyed to a discharge outlet not shown (at the upper end of the cylinder 14).

At the lower end of the cylinder 14 is provided an auger cage 15 comprising a U shaped support member 16 the legs of which are secured to the outer surface of the cylinder 14 so as to provide a support for bearings 17 for the end of the shaft 12. The shaft on the auger screw at the inlet end is therefore exposed at either side of the U shaped cage to allow the material to be engaged by the auger screw and carried into the main auger section for transport.

The main auger flight 11 is generally formed of a metal strip which is welded on the outside of the tube 111. The tube 111 is fixedly coupled to the shaft so as to rotate therewith with little or no possibility for slip between the tube and the shaft without damage to the coupling.

However a feed part of the auger flight is separate from the flight 11 and the tube 111 and is separately mounted on the shaft 12. The feed part is indicated at 17 and is formed of three separate flight sections 18, 19 and 20 one of which is shown in more detail in FIGS. 2, 3, 4 and 5. The three sections are bonded together at end to end abutment points 21 so that in the completed auger they form an integral part which rotates with the shaft as will be described hereinafter.

Turning to FIGS. 2, 3, 4 and 5, one of the flight sections is shown in more detail and comprises a sleeve portion 22 and a helical flight 23 attached thereto. The sleeve portion and the flight are integrally moulded from a suitable elastomeric material preferably natural rubber so as to provide a significant degree of flexibility both in the area of the flight and in the area of the inner sleeve. The inner sleeve and the flight are thus formed from a single piece without the necessity for any couplings or connections. The axial extent of the flight section is such that the flight 23 extends over one cycle of 360°. In this way when bonded to the next adjacent section, the flight thus formed extends over three full cycles which is sufficient to define an inlet section extending from the end of the cage 16 partly into the tube 14.

Figure 4:
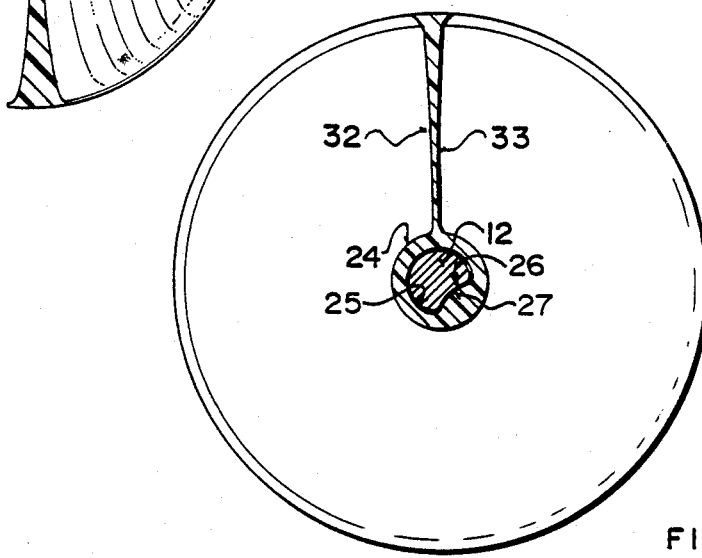
FIG. 4 is a transverse cross sectional view of the sleeve portion of FIG. 2.

The sleeve 22 is shown in cross section in FIGS. 3 and 4 and has an outer surface 24 which is of a circular cylinder. An inner surface 25 is shaped to match an outer surface of the shaft 12 over the full extent of the inlet part and it will be seen that the shaft 12 is generally cylindrical in outer surface with a flat 26 formed on one side. Thus the inner surface 25 is itself generally of circular cylindrical shape with a corresponding flat 27 so that the shaft can just be received as a sliding fit therein. It will be appreciated therefore that the non-circular shape of the inner surface and of the shaft causes a communication of torque from the shaft to the sleeve and hence to the flight. However the resilience of the elastomeric substance from which the flight section is moulded allows slippage to occur by distortion of the sleeve portion so that the flat 27 distorts to accommodate the circular part of the shaft 12. The length of the chord of the flat can be chosen relative to the resilience of the material from which the sleeve portion is moulded to allow slippage to occur at a predetermined maximum torque which is chosen to be sufficiently small that it avoids damage or injury to an object inserted into the auger flight while being sufficiently large to allow force to be applied to the material to transport it into the main auger flight.

As shown in FIG. 3, the inner surface is of constant cross section along its length except that at each end of the inner surface 25 there is provided a rib 28 which faces inwardly and which reduces the diameter or transverse dimension of the inner surface at the end of the inner surface so as to act as a band or rib clamping around the shaft. The rib 28 therefore act as a seal to prevent or at least inhibit the entry of contamination into the area between the shaft and the inner surface 25 of the sleeve.

Figure 5:
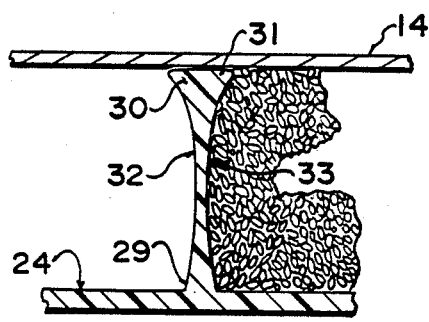
FIG. 5 is a cross sectional view showing the shape of the flight of the flight section of FIG. 2.

As shown in FIGS. 2 and 5, the flight of the flight section is moulded such that instead of forming a thin flat sheet of the conventional type, it increases in transverse dimension as it extends from a thinnest part as indicated at 29 in FIG. 5 adjacent the sleeve portion 24 to a widest part indicated at 30 adjacent the outer most edge thereof. The outer most edge is indicated at 31 and is formed by a relatively wide band of a width of the order of 0.75 inches which is more than twice the width or thickness of the flight adjacent the root thereof at the sleeve 24. This shape including the outer flat edge 31 defines curved surfaces 32 and 33 one of which is on an upstream side of the flight and hence forces against the material to be fed. This curved surface thus cups the material to be fed and any distortion of the flight under which it tends to bend away from the material does not allow a space or opening to develop between the outer edge 31 and the tube 14. This prevents or reduces slippage of the material past the flight which can significantly reduce the amount of material fed particularly at the feed end where the initial movement of the material is generated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger comprising a shaft rotatable about a longitudinal axis thereof, a tube surrounding the shaft, a main flight section fixed to the shaft for rotation therewith to forward material along the tube and an inlet flight section separate from the main flight section, the inlet flight section comprising a sleeve portion having a generally cylindrical outer surface and an inner surface for directly surrounding and contacting the shaft, a helical flight mounted on said outer surface for rotation therewith about said longitudinal axis, said sleeve portion and said flight being integrally moulded from a rubber material, said inner surface having a cross section which is a circle having a single flat portion at one part of the circle arranged such that when engaging a corresponding cross section on said shaft it can receive torque therefrom communicated by coaction between the flat portion of the inner surface and a flat portion of the shaft up to a predetermined maximum and above said maximum allows slippage to occur between said shaft and said sleeve while said fixed connection between the said main flight section and the said shaft precludes slippage therebetween, and said helical flight is shaped in cross section such that it is symmetrical about a center line thereof extending outwardly from the sleeve portion and a thickness thereof increases from a thinner part remote from the outer edge to a thicker part at the outer edge with the outer edge being substantially flat and lying in the surface of an imaginary cylinder surrounding the sleeve portion, the thinner part being flexible to allow the flight to flex when engaging a rigid object.

2. The invention according to claim 1 wherein the inner surface includes a circumferential rib adjacent each end thereof, said rib projecting radially inwardly therefrom so as to more tightly engage the shaft at the rib whereby said rib acts as a seal on the shaft to prevent the entry of contamination between said sleeve portion and said shaft.

3. The invention according to claim 1 flight section has an axial length less than that of the shaft.

4. The invention according to claim 3 wherein the flight section has an axial length sufficient to receive 360° of said helical flight.

5. The invention according to claim 1 wherein at least one side face of the helical flight is curved in cross section of the helical flight to form a cup portion.

* * * * *